United States Patent

[11] 3,620,247

[72] Inventor John W. Curnow
Utica, Mich.
[21] Appl. No. 41,343
[22] Filed May 28, 1970
[45] Patented Nov. 16, 1971
[73] Assignee Sperry Rand Corporation
Troy, Mich.

[54] POWER TRANSMISSION
8 Claims, 1 Drawing Fig.
[52] U.S. Cl. .................................................. 137/489, 251/28
[51] Int. Cl. ............................................. F16k 17/10
[50] Field of Search ...................................... 137/489, 490, 492.5, 488

[56] References Cited
UNITED STATES PATENTS
Re. 25,524  2/1964  Douglas ................... 137/489
2,308,753  1/1943  Hart ........................ 137/489
2,580,128  12/1951  Renick ..................... 137/489
2,619,111  11/1952  Renick ..................... 137/489
2,680,453  6/1954  Prijatel .................... 137/490
2,747,606  5/1956  Adams et al. ............. 137/489

Primary Examiner—M. Cary Nelson
Assistant Examiner—Robert J. Miller
Attorney—Van Meter and George ABSTRACT: A pilot-operated pressure relief valve has two concentric poppets in series between the inlet and outlet and each is controlled by a piston tending to open the same. The piston for the upstream poppet is responsive to inlet pressure and the piston controlling the downstream poppet is responsive to the pressure between the poppets which is a predetermined fraction of the inlet pressure. The valve is useful for minimizing foaming with fluids susceptible thereto and may be also utilized in systems where a fixed ratio is to be maintained between the pressures in two different parts of the system.

PATENTED NOV 16 1971
3,620,247
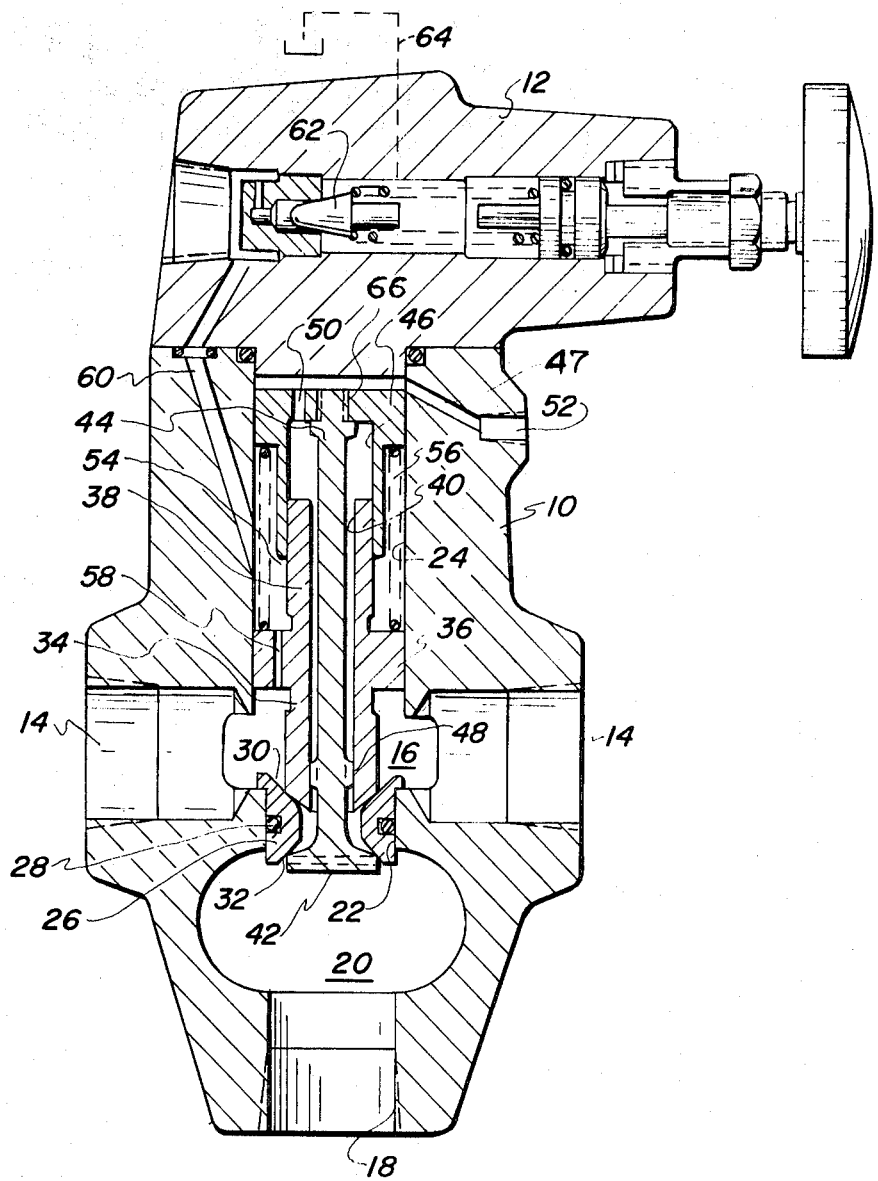
INVENTOR.
JOHN W. CURNOW
BY
ATTORNEYS

POWER TRANSMISSION

When the usual pilot-operated poppet-type relief valve is utilized in a hydraulic system charged with a fluid medium containing water or other fluids which possess high-vapor pressures, difficulties are encountered with foaming of the medium as it passes with high velocity and turbulence through the space between the poppet and the seat. The multitude of bubbles thus formed have a highly erosive action on the poppet and the seat, thus shortening the useful life of the valve.

There is also a requirement in some hydraulic systems for the regulation of pressure in two different parts of the system in such a way that a constant ratio is maintained between them and this requirement has heretofore been met only be a rather complex and expensive circuitry and valves.

The object of the present invention is to provide a valve which under control of a pilot relief valve can relieve fluid in two stages through a pair of poppet valves in series to minimize foaming problems.

A further object is to provide such a valve in which the pressure intermediate the two poppets is maintained in a fixed ratio to the inlet pressure.

The invention consists in a pressure relief valve which comprises a body having an inlet for fluid to be limited to a predetermined pressure, an outlet for relieved fluid, oppositely acting poppet valves in series between the inlet and the outlet with a first piston connected to one poppet and being exposed to inlet pressure in a direction to open the poppet, together with a second piston exposed to the pressure between the poppets and acting in a direction tending to open the other poppet. A bore in the body receives both pistons and forms a control chamber between the pistons in which the pressure tends to close both poppets and a pilot control circuit extends from the inlet to an exhaust passage by way of the control chamber, there being a fixed restriction and a pressure responsive variable restriction in the circuit, one on each side of the control chamber.

IN THE DRAWING

The single figure is a longitudinal section of a two-stage pressure relief valve incorporating a preferred form of the present invention.

The valve comprises a body 10 having a cap 12. A pair of inlet ports 14 are connected by a through passageway with the inlet chamber 16 and an outlet port 18 communicates with the outlet passage 20. A bore 22 connects the spaces 16 and 20 and is axially in alignment with a piston bore 24 which is closed at the top end by the cap 12. A bushing 26 having a seal ring 28 is pressed into the bore 22 and has oppositely facing conical valve seats 30 and 32. A first poppet 34 cooperates with the seat 30 and is controlled by a piston 36 exposed on its lower face to the inlet pressure in chamber 16 in a direction tending to open the poppet. The piston 36 has a skirt extension 38 on its upper face and an interior bore 40. A second poppet 42 cooperates with the seat 32 and has a stem 44 carrying at its upper end a piston 46. The skirt extension 38 is telescoped into a bore 47 of the piston 46 with a sliding fit. The stem 44 has three or more radial guide vanes 48 fitting in the bore 40, but is otherwise sufficiently spaced from the walls of the bore to provide a passage from the interior of bushing 26 up to the under side of piston 46 and through one or more passages 50 therein to the upper end of the bore 24 where fluid pressure tends to force the piston 46 downwardly and open the poppet valve 42. An inlet 52 in the side of the body connects with the space at the upper end of the bore 24.

The space between the pistons 36 and 46 forms a control chamber 54 in which a spring 56 serves to maintain a continuous separating force on the pistons. Pilot control of the valve is established by a control circuit which commences at the inlet chamber 16 and extends through a fixed restriction 58 in the piston 36 to the control chamber 54. From this chamber, a passage 60 in the body and in the end cap 12 leads to an adjustable spring-loaded pressure relief valve, generally designated 62, which may be of any usual configuration and from which the control circuit extends as indicated by the dotted line 64 to an exhaust passage at some lower pressure, usually the same sump to which the outlet 18 is connected.

So long as the pressure within the inlet chamber 16 remains below the pressure at which the pilot relief valve 62 is set, no flow occurs through the control circuit 54, 58, 60, 62 and 64. As that pressure rises, however, and valve 62 begins to open, flow occurs through this control circuit and when the flow increases to a point where the pressure drop through the fixed restriction 58 allows the inlet pressure in chamber 16 to raise piston 36 against spring 40, the poppet 34 will begin to open. This causes a rise in the pressure within the bushing 26 between the two poppets and this pressure is immediately transmitted through the bore 40 and the passage 50 to the top of piston 46 urging it to descend and open the poppet 42.

Because of the telescoped relationship between the skirt 38 and the piston 46, which is along a diameter approximating that of the seat diameter of poppet 42, the net area at the top of piston 46 that is actively responsive to the pressure between the two poppets is the annular area beyond the telescoping diameter. The same area at the bottom of the piston 46 is exposed to the intermediate pressure in the control chamber 54. When the former pressure exceeds the latter pressure by a small amount, represented by the spring force and the Bernoulli forces acting on the poppets, poppet 42 will also open allowing flow to occur from inlet 14 to outlet 18. Thus there is maintained a two-stage relief action at the poppets 34 and 42 such that the pressure between the poppets in the bushing 26 is a predetermined fraction of the inlet pressure. This fraction is determined by the relative diameters of the poppet seats, the telescoping skirt and the overall piston diameters. In this way it is assured that the throttling action at the two poppets will be divided equally or in some other desired proportion and the extreme velocities and turbulence which would occur if only one poppet were utilized are avoided.

In addition, in those circuit situations which require a predetermined ratio to be maintained between the pressures in two different parts of the system, the inlet 52 may be utilized to relieve fluid through the passage 50, the bore 40 and the poppet 42. The pressure at which this relieving action occurs is always a predetermined fraction of the pressure at which fluid is relieved from the main inlet 14.

In assembling the valve, the poppet 42, the bushing 26, the poppet and piston 34–36, the spring 56, and the piston 46 are stacked upon and within one another in the order recited and outside of the body 10. The stem 44 is secured to the piston 46 at 66 by a threaded or other suitable connection. After this, the cartridge thus formed is inserted into the bores 22 and 24 with a press fit in the former bore. The parts may also be assembled by pressing the bushing 26 into the bore 22 and then assembling the parts as described above.

I claim:

1. A pressure relief valve comprising a body having an inlet for fluid to be limited to a predetermined pressure, an outlet for relieved fluid, oppositely opening poppet valves in series between the inlet and outlet, a first piston connected to one poppet and exposed to inlet pressure tending to open the poppet, a second piston exposed to the pressure between the poppets tending to open the other poppet, a bore in the body for receiving both pistons and forming a control chamber between the pistons in which the pressure tends to close both poppets, and a pilot control circuit extending from the inlet to an exhaust passage by way of the control chamber, there being a fixed restriction and a pressure responsive variable restriction in the circuit, one on each side of the control chamber.

2. A valve as defined in claim 1 wherein one piston includes a skirt extending into the control chamber, the skirt being slidably telescoped into the other piston.

3. A valve as defined in claim 2 wherein the piston skirt telescopes along a diameter approximating that of one of the poppet areas.

4. A valve as defined in claim 1 and means forming a second inlet for fluid to be limited to a second pressure in predetermined proportion to the first pressure, the second inlet communicating with the space between the two poppets.

5. A valve as defined in claim 1 including a single spring within the control chamber acting to separate the pistons and close the poppets.

6. A valve as defined in claim 1 including means for adjusting the pressure at which the variable restriction operates.

7. A valve as defined in claim 1 including an annular bushing having oppositely facing valve seats, the body having a bore coaxial with the first-mentioned bore and connecting between the inlet and outlet to receive the bushing.

8. A valve as defined in claim 7 wherein the bushing is preassembled into a cartridge comprising the pistons and the poppet valves with the bushing held between the poppets and wherein the cartridge is mounted in the two bores as a unit.

* * * * *